United States Patent [19]
Dell'Orfano et al.

[11] Patent Number: 6,051,110
[45] Date of Patent: Apr. 18, 2000

[54] THERMOLYTIC DISTILLATION OF CARBONACEOUS MATERIAL

[76] Inventors: William Dell'Orfano, 15 Pilgrim Dr., Bedford, N.H. 03110; Andrea Rossi, 1799 Bodwell Rd., No. 21, Manchester, N.H. 03109

[21] Appl. No.: 09/070,562

[22] Filed: Apr. 30, 1998

[51] Int. Cl.[7] ............... C10B 1/00; C10B 47/14; C10B 49/14

[52] U.S. Cl. ............ 202/219; 202/262; 202/117; 201/10; 422/268

[58] Field of Search ............ 202/219, 117–119, 202/103, 108; 48/92; 201/10, 11, 25; 110/346, 269; 588/201; 198/710, 711, 712, 725, 727, 681, 808, 837, 705, 706, 704; 422/268, 290, 301

[56] References Cited

U.S. PATENT DOCUMENTS

| | | |
|---|---|---|
| 1,536,908 | 5/1925 | Morgan . |
| 1,541,404 | 6/1925 | Smith ................................ 202/117 |
| 1,541,405 | 6/1925 | Smith ................................ 202/117 |
| 1,681,808 | 8/1928 | Morgan . |
| 2,459,550 | 1/1949 | Stamm . |
| 3,679,045 | 7/1972 | Morgan et al. ................ 198/370.05 |
| 3,977,960 | 8/1976 | Stout . |
| 4,151,754 | 5/1979 | Reist ................................ 74/89.2 |
| 4,574,714 | 3/1986 | Bach et al. . |
| 4,944,387 | 7/1990 | Burke ................................ 198/706 |
| 5,085,738 | 2/1992 | Harris et al. . |
| 5,119,939 | 6/1992 | Teeter et al. ................ 198/860.2 |
| 5,301,620 | 4/1994 | Nagel et al. . |
| 5,449,438 | 9/1995 | Jagau et al. ................ 201/10 |
| 5,555,822 | 9/1996 | Loewen et al. . |
| 5,693,188 | 12/1997 | Donnohue et al. . |

FOREIGN PATENT DOCUMENTS

| | | |
|---|---|---|
| 869812 | 10/1940 | France . |
| 174 | of 1853 | United Kingdom . |
| 192572 | 2/1923 | United Kingdom . |
| 580579 | 9/1946 | United Kingdom . |

*Primary Examiner*—Marian C. Knode
*Assistant Examiner*—Susan Ohorodnik
*Attorney, Agent, or Firm*—John L. Lee

[57] ABSTRACT

In apparatus for thermolytic distillation of lump carbonaceous material, an enclosure contains a degassing bath, a reactor bath and a quenching bath. A closed loop continuous chain conveyor drives a plurality of baskets carrying carbonaceous material through the three baths of the enclosure. The carbonaceous material is degassed in hot distillate, then immersed in molten lead in the absence of oxygen to produce char and vapor by thermolytic distillation. The char is quenched with water in the absence of oxygen. At least a portion of the vapor is condensed to produce combustible distillate.

9 Claims, 6 Drawing Sheets

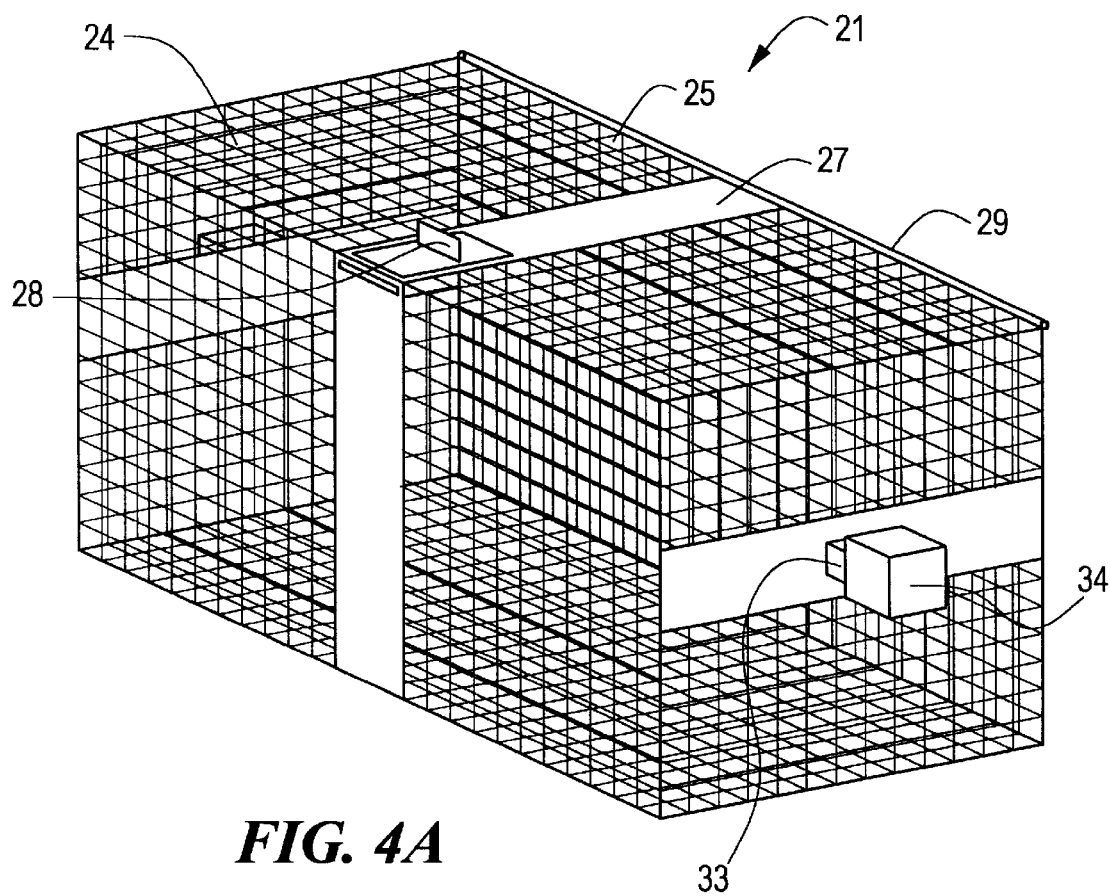
FIG. 4A
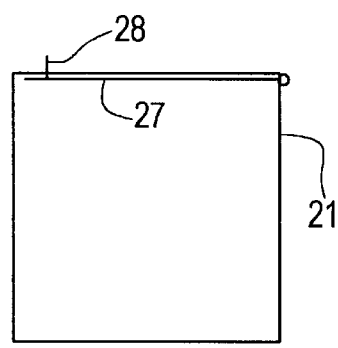 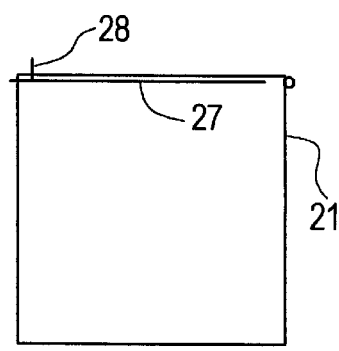
FIG. 4B  FIG. 4C

THERMOLYTIC DISTILLATION OF CARBONACEOUS MATERIAL

TECHNICAL FIELD

The invention relates generally to transformation of carbonaceous material such as waste wood into liquid hydrocarbons and char.

BACKGROUND OF THE INVENTION

The need for better methods for disposal of waste products has long existed. Society now recognizes the need to handle waste products in an environmentally sound manner that avoids building landfills and creating air or water pollution. Further, carbonaceous material may yield commercially desirable products. The concept of using molten metal, including lead, for the thermal conversion of organic matter into useful products is generally known. U.S. Pat. No. 2,450,550 to Stamm discloses distillation of granular wood or coal by submerging the granules in a molten metal bath and passing the granules through the bath, sandwiched between two endless screens. U.S. Pat. No. 3,977,960 to Stout et al. discloses thermal conversion of crushed oil shale into useful products in a chamber containing molten metal or salt in the absence of air, and the use of recovered oil in air sealing means (column 4, line 19). U.S. Pat. No. 5,085,738 to Harris et al. discloses thermal conversion of organic wastes, including vehicle tires, into useful products in a chamber containing molten lead, in the absence of air, utilizing gravity rather than a container or the like to convey the wastes through the molten lead. U.S. Pat. No. 5,693,188 to Donnohue et al. discloses thermal conversion of organic wastes, including vehicle tires and plastics, into useful products in an elongated chamber containing molten lead, in the absence of air, utilizing an auger to convey the wastes through the molten lead. U.S. Pat. No. 5,605,551 to Scott et al. discloses a process for thermal conversion of biomass such as wood to liquids by pyrolysis in a fluidized bed in which the conveying gas contains low and carefully controlled amounts of oxygen. U.S. Pat. No. 5,584,970 to Schmalfeld et al. discloses a process for thermal conversion of biomass such as wood to charcoal, the process involves drying the wood in a first flow of hot gas and then carbonizing the wood in a second flow of hot gas.

Throughout the world, there are millions of tons of wood scrap waiting for a reasonable way of recycling. Actual utilization of the wood scrap in the industrialized countries are:

1) Combustion in furnaces to produce electric power and steam.
2) Conglomeration to produce low quality dirty wood, tools or furniture.
3) Reforming of pallets.
4) Production of wood-dust for drying purposes.
5) Recovery of cellulose raw materials.
6) Production of coke carbon by pyrolysis.

The prior art has not suggested a commercially viable, continuous processing method and apparatus for thermal conversion in the absence of oxygen of scrap wood to produce commercially desirable products.

OBJECTS OF THE INVENTION

The principal objects of the present invention are to provide an improved process and apparatus for thermal conversion of organic matter; to provide an improved continuous process and apparatus for thermal conversion of organic matter utilizing a plurality of removable baskets, a compact three-bath structure including a bath of distillate, a bath of molten lead, and a bath of water, and a simple closed-loop conveyance system having rails for guiding the baskets through the three baths, wherein organic matter is carried through a molten lead bath and converts to gaseous hydrocarbons; to further provide such a process wherein scrap wood is thermally converted to vapor forms that may be condensed and further separated to commercially valuable hydrocarbons and char; to further provide such a process wherein residual solids from the thermal conversion, including char and lead, are captured and separated; to further provide such a process wherein a portion of the combustible vapors emitted from the thermal conversion of organic matter is utilized to heat the molten lead bath in the reaction bath; to provide such a process and apparatus that is relatively simple, utilizes inexpensive equipment and is particularly well adapted for the thermal conversion of scrap wood, including scrap wood which may be contaminated with lead paint.

SUMMARY OF THE INVENTION

A preferred embodiment of the apparatus for thermolytic distillation of carbonaceous material includes an enclosure having a degassing bath containing hot distillate, a reactor bath containing molten lead suitable for promoting thermolytic reaction of carbonaceous material to produce char and vapor, and a quencher bath containing water for cooling the char; a conveyor for conveying the carbonaceous material into the enclosure and through the reactor bath, and for conveying the char out of the enclosure; and a condenser for condensing at least a portion of the vapor to produce distillate. In the preferred embodiment, the degassing bath has a baffle extending downward into the distillate to provide a first atmospheric seal, and the quencher bath has a baffle extending downward into the water such as to provide a second atmospheric seal.

The preferred embodiment of the apparatus further includes a pair of facing hollow rails, each rail forming a closed loop in a vertical plane, each rail having a substantially vertical distal side with respect to the other rail, an outer side with respect to the loop, an inner side with respect to the loop, and a substantially vertical proximal side with respect to the other rail, the proximal side having a pair of facing lips defining a longitudinal slot; and a set of chain-linked basket drivers; wherein each basket includes a pair of axles, each axle adapted to ride within one of the pair of rails.

In the preferred embodiment of the apparatus the basket drivers are U-shaped, having a pair of facing basket-retention surfaces. Each basket is retained, during travel through the enclosure, by the rail outer side, by the rail inner side, and by the pair of facing basket-retention surfaces. The rail outer side has a slot for allowing a basket to be inserted into or extracted from the conveyor system.

A preferred embodiment of the process for thermolytic distillation of carbonaceous material includes degassing lump carbonaceous material in hot distillate, immersing the carbonaceous material in molten lead in the absence of oxygen to produce char and vapor; quenching the char with water in the absence of oxygen; and condensing at least a portion of the vapor to produce distillate.

The preferred embodiment of the process further includes separating distillate into a light fraction, a heavy fraction and a combustible gas fraction.

The preferred embodiment of the process further includes grinding the char to produce char pulp; centrifuging the char pulp to purify the char pulp and recover solidified molten lead.

The preferred embodiment of the process further includes burning the combustible gas fraction outside the reactor bath to augment other means of heating the molten lead; and using the vapor to insulate the molten lead.

BRIEF DESCRIPTION OF THE DRAWINGS

FIG. 4A is a detailed perspective view of a basket of the embodiment of FIG. 1.

FIG. 4B is an end view of a basket with the lid closed and unlatched.

FIG. 4C is an end view of a basket with the lid closed and latched.

DETAILED DESCRIPTION OF THE INVENTION

General

The invention provides a process and apparatus for converting carbonaceous material into useful product by thermolysis (dissociation of a compound by heat) in a bath of molten medium, in the absence of oxygen. In a preferred embodiment the invention provides a process for converting wood to char and wood-petrol in a bath of molten metal (such as lead or tin, or a mixture thereof) or in a bath of molten salt. In a preferred embodiment the molten medium is molten lead.

Figure 1:
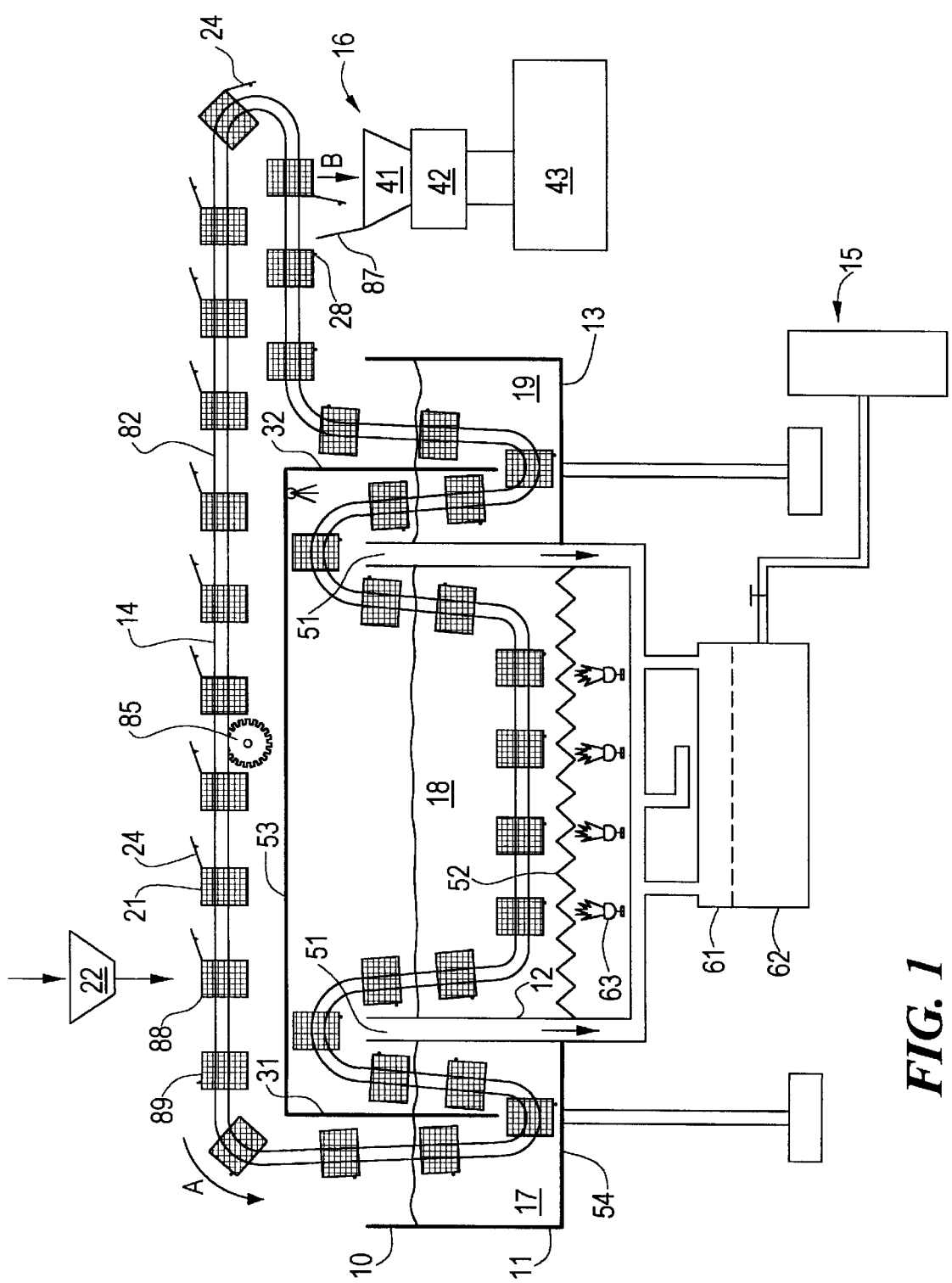
FIG. 1 is a schematic representation of a first embodiment of the process and apparatus of the invention.
Figure 2:
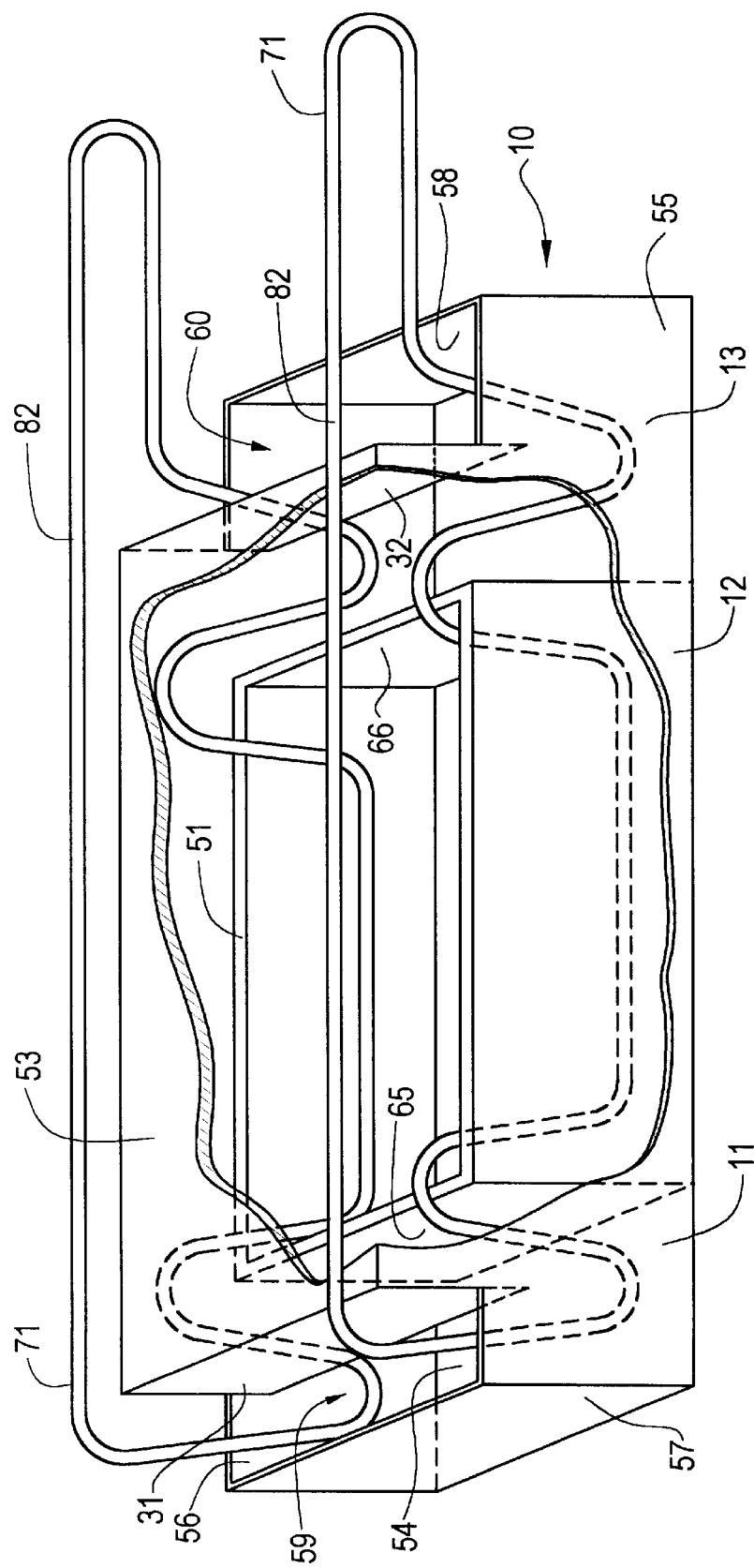
FIG. 2 is a partial cut-away perspective view of the apparatus of FIG. 1.

FIG. 1 illustrates the process and apparatus of the preferred embodiment. The apparatus shown in FIG. 1 includes an enclosure 10 which contains three baths, degassing bath 11, reactor bath 12, and quenching bath 13. The apparatus also includes conveyor system 14, separation system 15, and char processor 16. Two atmospheric seal baffles, 31 and 32, are positioned to prevent air, and in particular oxygen, from entering the region of the reactor bath. FIG. 2 locates the path of rails 71 of the conveyor system with respect to the three baths and the two baffles.

The process operates as follows. Referring to FIG. 1, lump wood is loaded into steel basket 21, through feed hopper 22. Baskets containing wood are carried in conveyor system 14 and are driven by chain-linked basket drivers in the direction shown by arrow A. The basket drivers push the baskets with their load of wood down into degassing bath 11, which contains hot distillate (wood petrol) 17. The wood degasses in the degassing bath. The basket drivers then push the baskets with their load of degassed wood under first baffle 31. Baffle 31 has the shape of a curtain wall whose lower edge is beneath the surface of the wood petrol in bath 11. Baffle 31 maintains an atmospheric seal.

The basket drivers next push baskets containing degassed wood down into reactor bath 12. Reactor bath 12 contains molten medium 18, preferably molten lead. During a predetermined immersion time in bath 12, char and vapor, the vapor including volatile hydrocarbons, are produced by thermolysis of the degassed wood. The basket drivers then push the baskets, now carrying a load of char, into quencher bath 13, which contains water 19, and under the second baffle 32. Baffle 32 maintains an atmospheric seal. The basket drivers then drive baskets out of the quencher bath.

Char remaining in the basket is removed from the basket and collected via char collection hopper 41 as shown by arrow B. The char is ground up in grinder 42 to produce char pulp. The char pulp is then centrifuged in centrifuge 43 to separate residual solidified molten material from the char. This process produces metal-free char and recaptures solidified molten material, including lead carried from reactor bath 12 and lead from the paint of any lead-painted wood in the basket.

Vapor, including volatile hydrocarbons, produced by thermolysis in reactor bath 12 exits downward via channels 51 in the walls of the reactor bath. The vapor then passes through condenser 61 to condense distillate (wood-petrol) and other condensable products, e.g. water, and to liberate combustible and non-combustible gases. Wood-petrol collects in tank 62. Wood petrol from tank 62 is separated into a light fraction, a heavy fraction, and non-condensed combustible gas in distillation column separation system 15. Some or all of the combustible gas is burned in burners 63 to provide heat for the process. A portion of the distillate product is recycled into degasser bath 11 to maintain the level of distillate in the degasser bath.

Channels 51 in the end walls of reactor bath 12, and similar channels in the side walls of the reactor bath provide a passage for vapor produced by thermolysis. The double-wall structure of reactor bath 12 significantly reduces heat loss from the molten material. The double wall also insulates baths 11 and 13 from the high temperature of the reactor bath. In passing through channels 51, the vapor captures any heat lost by conduction from the molten material through the walls of reactor bath 12 and recycles it via the burners. This improves the thermal efficiency of the process.

Figure 3A:
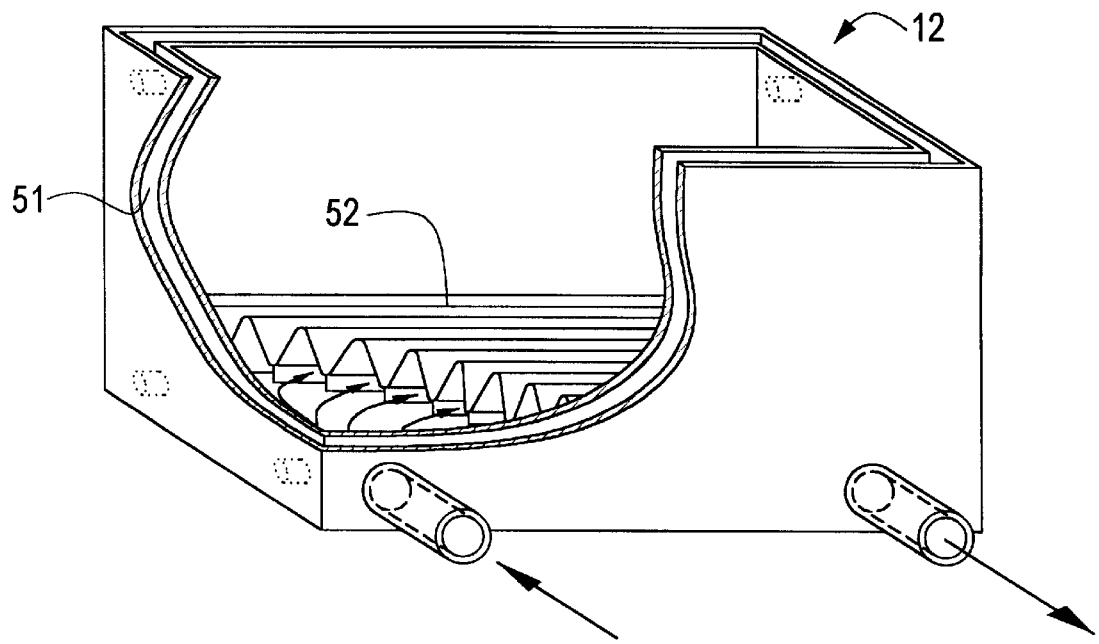
FIG. 3A is a cut-away perspective view.
Figure 3B:
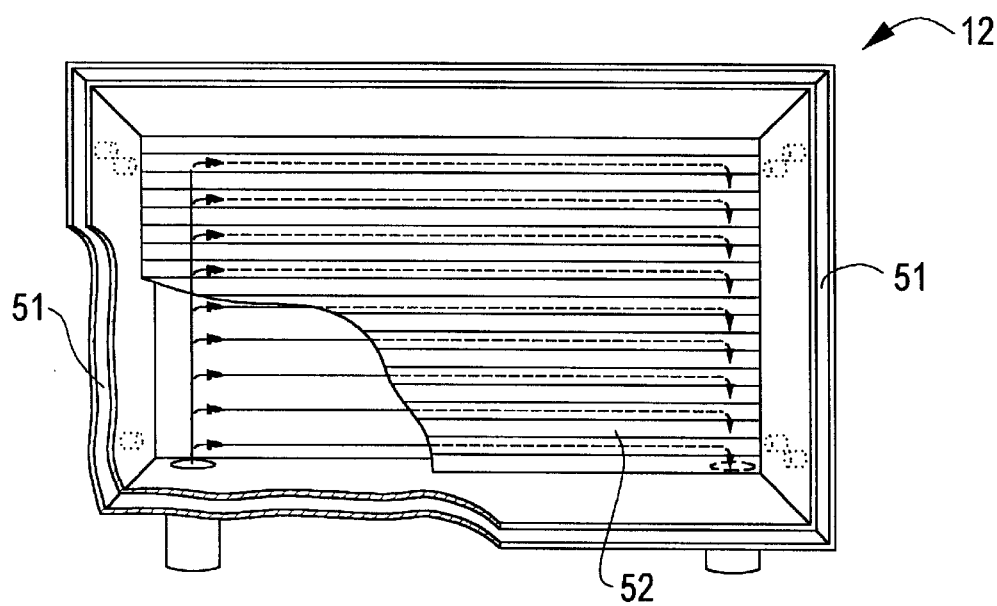
FIG. 3B is a top view, of the reactor bath of FIG. 1.

Reactor bath 12 has a corrugated bottom 52. The corrugated bottom significantly increases the surface area of the reactor bath bottom and serves as an efficient heat exchanger to facilitate heat transfer between the hot gases from the burners and the molten material in the bath. The corrugated bottom also provides the strength needed to support the enormous weight of a bath of molten lead. Corrugated bottom 52 of reactor bath 12 is illustrated in FIGS. 3A and 3B. Arrows in FIGS. 3A and 3B show the flow of the burner gases through the heat exchanger.

FIGS. 3A and 3B also give detail of the double wall construction of reactor bath 12 that defines channels 51.

FIG. 4A is a detailed view of porous basket 21. The basket has a lid 24, attached to the basket by hinge 29. The lid is shown open ready for the basket to be filled with lump wood. The walls of the basket are made of heavy wire mesh or heavy pressed steel having multiple apertures 25 which allow the molten lead to penetrate the basket and contact the lump wood. In the preferred embodiment the basket is 36 inches long, 18 inches deep and 18 inches wide. In a high capacity application, the basket could be 72 inches long. Apertures may be formed by the wire mesh construction shown in FIG. 4A or may be narrow slits as in expanded pressed steel. In either case the apertures need to be small enough in at least one dimension to prevent pieces of wood having small cross section from falling out of the basket through the apertures. The wood to be processed has a maximum cross section to ensure that all of the wood is fully cooked in the fixed immersion time that the apparatus is designed to provide.

Each basket rides between hollow rails 71 of the conveyor system. The path of the hollow rails is illustrated in FIGS. 1 and 2. FIG. 4A shows each basket having an axle 33 and a push block 34 rigidly attached to the axle. Each push block is driven by a driver within its rail, and is supported by the axles which are adapted to slide within facing longitudinal slots in the rails.

Figure 5:
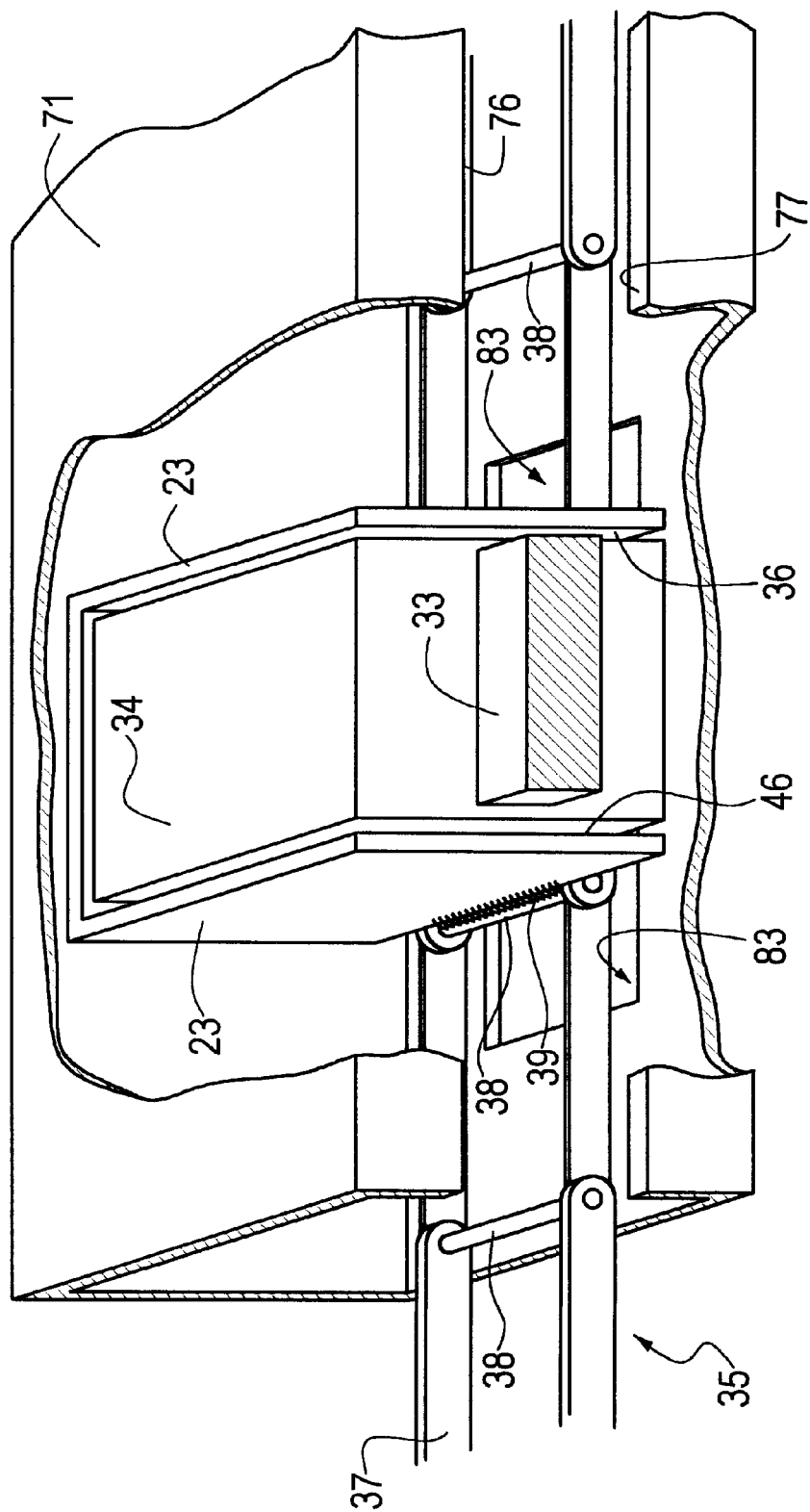
FIG. 5 is a partial cross section view of a rail with basket axle and push-block, and basket drive components.

FIG. 5 shows basket push-block 34 located within a driver 23, the driver having a drive face 36 and an opposite face 46. Chain 35 has a plurality of links 37 connected by pivots 38 forming a continuous chain. FIG. 5 shows a cut-away portion of rail 71 and a sectioned portion of axle 33. Axle 33 is sized to ride between lips 76 and 77 of rail 71. Chain 35 rides within hollow rail 71, as shown in FIG. 5. Drive face 36 pushes on the corresponding push block 34 of its basket. Drive face 36 and opposite face 46 constitute a pair of retaining faces for push block 34. Drivers are mounted to the chain at intervals as indicated in FIG. 1. FIG. 5 shows each driver welded to a pair of adjacent pivots—see weld 39. The pair of adjacent pivots are underneath (and partially hidden by) push-block 34. FIG. 5 also shows a short longitudinal drive slot 83 in the lower side of the rail.

Figure 6:
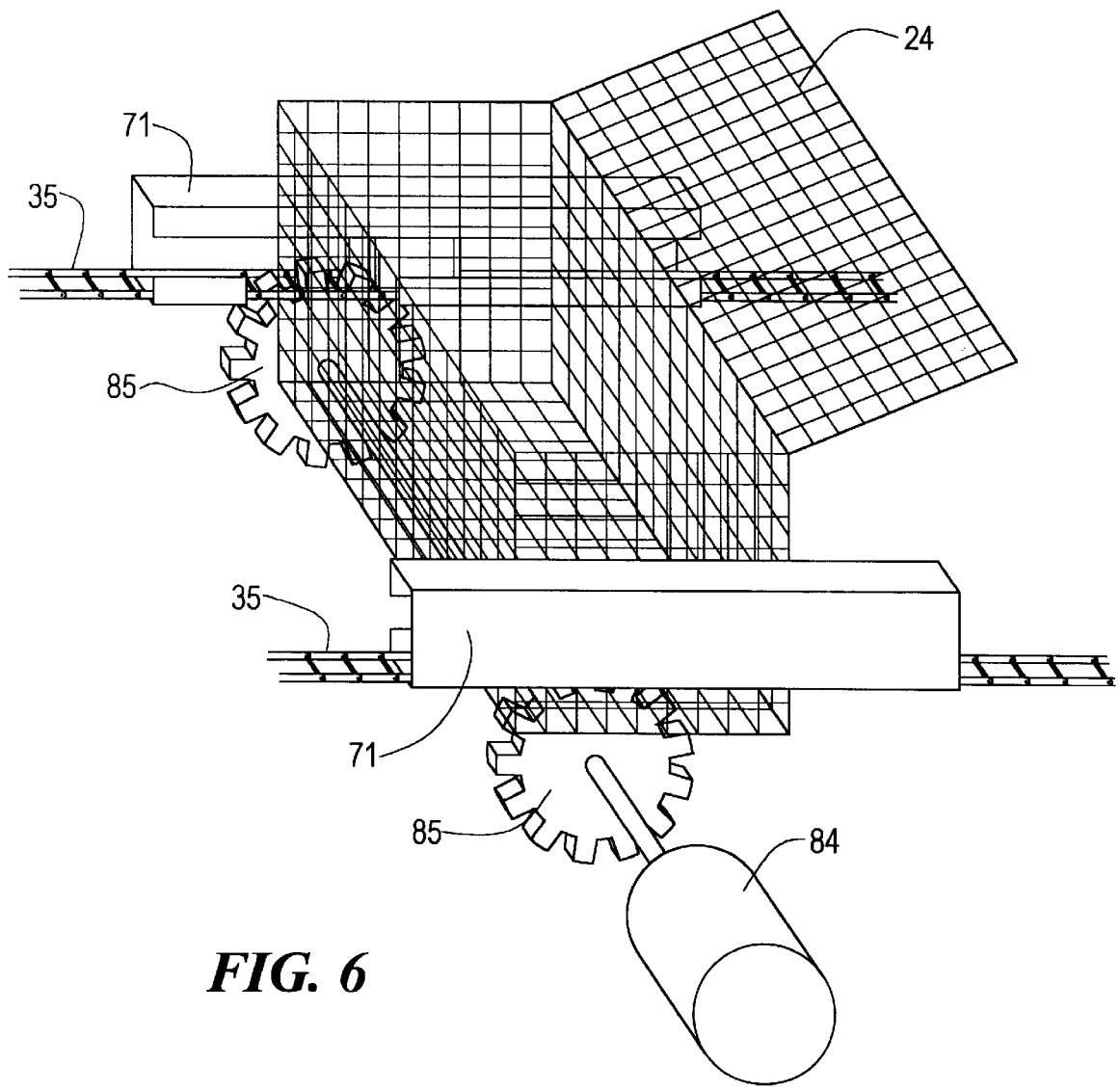
FIG. 6 is a partial perspective view of the chain drive system.

FIG. 6 is a perspective view of the basket drive mechanism. Drive motor 84 rotates a pair of drive sprockets 85 which engage with conveyor chain 35 via the short longitudinal slot.

Figure 7:
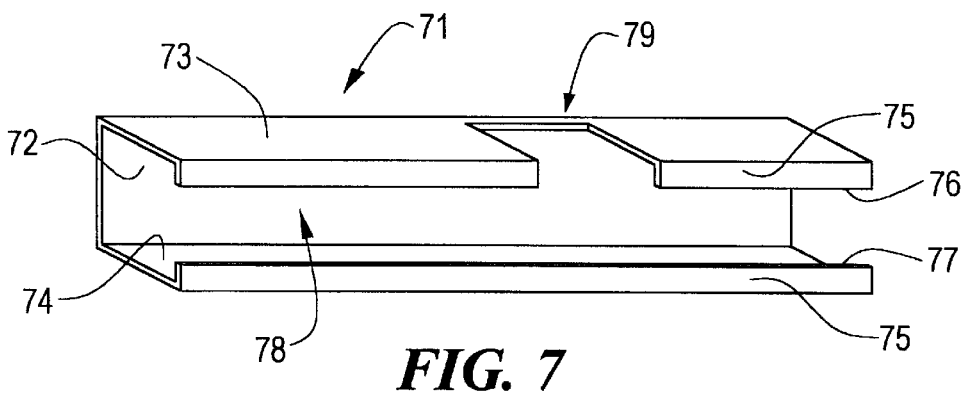
FIG. 7 is a partial perspective view of a portion of a rail having a basket access slot.

FIG. 7 is a partial perspective view of a portion of hollow rail 71. Each rail forms a closed loop in a vertical plane as shown in FIG. 2. FIG. 7 shows rail 71 having a substantially vertical distal side 72 with respect to the other rail, an outer side 73 with respect to the loop, an inner side 74 with respect to the loop, and a substantially vertical proximal side 75 with respect to the other rail, the proximal side having facing lips 76 and 77 defined by longitudinal slot 78. Longitudinal slot 78 extends along the entire loop of the rail. In the preferred embodiment, the width of the distal side 72, the outer side 73, and the inner side 74 are each 3.5 inches, and the distance between lips 76 and 77 is 1.5 inches.

FIG. 7 also shows a short upward-facing basket access slot 79 in the outer wall of the rail. This slot allows a basket to be lowered into the conveyor, or a basket to be lifted out of the conveyor. Basket access slot 79 is located in FIG. 1 at location 82.

In addition to gas burners 63 shown in FIG. 1, electric heaters (not shown) may be used to start the process, or to augment the gas burners.

The basket includes latch 27 as shown unlocked in FIG. 4B and locked in FIG. 4C. FIG. 1 shows latch actuator 87 about to actuate latch handle 28, thereby automatically unlatching the lid for unloading at location B. Latch handle 28 is also used to latch the lid after manually closing of the lid following loading of the basket via feed hopper 22, and inspection of the load. The basket with lid open for loading is shown in FIG. 1 as 88, and the basket with lid closed is shown as 89.

Referring to FIGS. 1 and 2, the enclosure has a top plate 53, a bottom plate 54, first side plate 55, a second side plate 56, an entry-end plate 57, and an exit-end plate 58. Enclosure 10 has an entry aperture 59 proximate to the entry-end plate, and an exit aperture 60 proximate to the exit-end plate. Reactor bath 12 has a first wall 65, proximate to the entry-end plate, extending upward from the bottom plate, a second wall 66, proximate to the exit-end plate, extending upward from the bottom plate, a first baffle 31 extending downward from the top plate and located between the entry-end plate and the first wall, a second baffle 32 extending downward from the top plate and located between the second wall and the exit-end plate, and at least one vapor exit channel 51 located between the first wall and the second wall. The entry-end plate and the first wall define a degassing bath containing distillate for degassing. The first wall and the second wall define a reactor bath containing molten material for promoting thermolytic reaction to produce char and vapor. The second wall and the exit-end plate define a quenching bath containing water. The first baffle extends sufficiently down into the degassing bath to provide a seal between a gas-phase volume of the reactor bath and atmosphere at the entry-end plate. The second baffle extends sufficiently down into the degassing bath to provide a seal between a gas-phase volume of the reactor bath and atmosphere at the exit-end plate.

EXAMPLE 1

Distillation of Wood

In a preferred embodiment, the reactor bath is 20 feet long, and 4 feet wide. It is fabricated from stainless steel AISI 310 or other material resistant to the temperature and chemicals involved in the process. Molten lead is used at a temperature of approximately 750° F. (400° C.). The depth of the molten lead is 1.5 feet.

The basket is 36 inches long, 18 inches deep and 18 inches wide, i.e. 6.75 cubic feet per basket. Ten baskets are submerged at a given time. Wood having a maximum cross section of one inch is loaded into the baskets. Driver faces are approximately 3 inch by 3 inch. Chain speed is selected to provide a 10 minute immersion time, which is sufficient to fully cook wood having a smallest cross section no greater than one inch.

Assuming the 6.75 cubic feet baskets are loaded with a fill density of 90%, there are 79 lb of wood in each basket. Assuming 10 loaded baskets are submerged at a given time, and immersion time for a given loaded basket is 10 minutes, then 790 lb of wood is treated every 10 minutes. Thus, the process will treat 4,740 lb/hour, i.e. 2.37 tons/hour or 57 tons/day. For a higher throughput rate, the wood may be chopped more finely and the chain speed increased. The smaller wood cross-section allows full cooking in the shorter immersion time associated with the higher chain speed.

Experimental Results

Experimental results, from experiments on thermolysis of wood conducted on a laboratory apparatus, are listed in Tables 1–5 below. These results are from tests conducted on various dates during the period November 1997 through January, 1998.

TABLE 1

ANALYSIS OF DISTILLATE (November 7, 1997)

| | |
|---|---|
| Calorific value | 20,000 BTU/kg |
| Engler # | 2–3 |
| Flash Point | 62° F. |
| Sulfur | absent |
| Chlorine | traces |
| Residue of distillation | 0.7% w |
| Lead | absent |

TABLE 2A

ANALYSIS OF TAR (November 7, 1997)

| | |
|---|---|
| Calorific value | 28,000 BTU/kg |
| Engler # | 30 |
| Flash Point | 124 F |
| Sulfur | absent |
| Chlorine | traces |
| Residue of distillation | 4% w |
| Lead | absent |

Tar for analysis was collected from a vapor exit pipe above the baskets. The material is a bituminous oil consisting of a mixture of heavy hydrocarbons

TABLE 2B

ANALYSIS OF TAR (Nov. 14, 1997)

| | Weight % |
|---|---|
| Carbon | 51.2% |
| Hydrogen | 6.51% |
| Nitrogen | 0.16% |
| Oxygen | 38.6% |
| Sulfur | 0.03% |
| Proximate Analysis | |
| Ash | 3.47% |
| Volatile Matter | 77.9% |
| Fixed Carbon | 18.6% |
| Heating Value in BTU/lb | 9090 BTU/lb |

TABLE 3

ANALYSIS OF COMBUSTIBLE GAS (Dec. 11, 1997)

| Components | Volume % | Weight % |
|---|---|---|
| Hydrogen | 3.77 | 0.22 |
| Oxygen | 1.47 | 1.34 |
| Nitrogen | 5.82 | 4.65 |
| Carbon Monoxide | 33.69 | 26.93 |
| Methane | 5.14 | 2.35 |
| Carbon Dioxide | 46.15 | 57.96 |
| Hydrogen Sulfide | <0.01 | <0.01 |

TABLE 3-continued

ANALYSIS OF COMBUSTIBLE GAS (Dec. 11, 1997)

| | | |
|---|---|---|
| Ethane | 1.07 | 0.92 |
| Propane | 0.54 | 0.67 |
| Butanes | 0.79 | 1.31 |
| Pentanes | 0.97 | 1.99 |
| Hexanes | 0.35 | 0.87 |
| > Hexanes | 0.24 | 0.78 |
| TOTALS | 99.99 | 99.99 |

| Components | Mole % | Weight % |
|---|---|---|
| Carbon | 31.09 | 32.96 |
| Hydrogen | 22.37 | 1.99 |
| Oxygen | 42.69 | 60.28 |
| Nitrogen | 3.85 | 4.77 |
| Sulfur | <0.10 | <0.10 |

| | |
|---|---|
| Specific Gravity (Air = 1) | 1.2099 |
| * Specific Volume, cu. ft./lb. | 10.83 |
| * Gross Heating Value, BTU/cu. ft. | 296.1 |
| ** Gross Heating Value, BTU/cu. ft. | 302.2 |
| ** Gross Heating Value, BTU/lb. | 3272.6 |
| ** Net Heating Value, BTU/cu. ft. | 284.5 |
| ** Net Heating Value, BTU/lb. | 3080.8 |
| * Net Heating Value, BTU/cu. ft. | 278.7 |
| Compressibility Factor "Z" (60° F., 14.696 psig) | 0.9972 |

* - Water Saturated at 0.25636 psig
** - Dry Gas @ 60° F., 14.696 psig

TABLE 4

ANALYSIS OF DISTILLATE (Dec. 24, 1997)

| | Heavy Fraction | Light Fraction |
|---|---|---|
| Calorific Value | 28,360 BTU/KG | 20,570 BTU/KG |
| Specific Gravity | 0.93 KG/liter | 0.84 KG/liter |
| Flash Point | 87° C. | 24° C. |
| Methanol | 13% W. | 26% W. |
| Ethanol | 2% W. | 3.5% w. |
| Viscosity ° E | 8 | 2 |
| Sulfur | Traces | Traces |
| Chlorine | Traces | Traces |
| Lead | Absent | Absent |
| Residue at 300° C. | 7% W. | 0.2% W. |
| Water in the Sample (The analysis was made after de-watering) | 8% | ~2% |

TABLE 5

YIELDS OF DISTILLATE & COMBUSTIBLE GAS (Jan. 11, 1998)

| OPERATING CONDITIONS | | | ANALYSIS | | | |
|---|---|---|---|---|---|---|
| MASS OF CHARGE | TEMP ° F. | RESIDENCE TIME (MINUTES/ SECONDS) | COAL % WT | LIQUID HEAVY % WT | LIQUID LIGHT % WT | GAS % |
| 38.4 g | 750 | 8'20" | 23.7 | 11 | 39 | 26.3 |
| 41.0 g | 800 | 9'9" | 24.15 | 12.43 | 39.25 | 24.15 |
| 35.9 g | 850 | 7'30" | 27 | 10 | 38.4 | 24.6 |
| | | | (with lead) | | | |

What is claimed is:

1. An apparatus for thermolytic distillation of lump carbonaceous material, comprising:

an enclosure defining a degassing bath for degassing the carbonaceous material, a reactor bath for containing molten material suitable for promoting thermolytic reaction of carbonaceous material to produce char and vapor, and a quencher bath for cooling the char the enclosure having a top plate, a bottom plate, first and second side plates,. an entry-end plate, an exit-end plate, an entry aperture proximate to the entry-end plate, and an exit aperture proximate to the exit-end plate;

a conveyor having a rail in the form of a closed loop, and having a plurality of porous baskets moveably mounted to the rail, wherein the rail includes serially connected first, second and third portions located inside the degassing bath, the reactor bath, and the quenching bath, respectively, and a fourth portion, located outside the enclosure, connected between the third portion and the first portion; and a condenser, coupled to accept the vapor from the reactor bath, for condensing at least a portion of the vapor to produce distillate;

wherein the degassing bath includes a downward extending first atmospheric seal baffle, and the quencher bath includes a downward extending second atmospheric seal baffle.

2. An apparatus according to claim 1, further comprising a heater for heating the molten material; wherein the reactor bath has a corrugated bottom for efficient heat transfer of heat from the heater to the molten material.

3. An apparatus according to claim 1, wherein the reactor bath has a wall and the wall contains a channel for passage of vapor from the enclosure, the channel shaped such that vapor passing through the channel captures heat lost by conduction from the molten material into the wall.

4. An apparatus according to claim 1, wherein the conveyor further includes a pair of facing hollow rails, each rail forming a closed loop in a vertical plane, the closed loop including three dipping portions, a first dipping portion for conveying baskets below the degassing bath baffle, a second dipping portion for conveying baskets into the molten material, a third dipping portion for conveying baskets below the quencher bath baffle.

5. An apparatus according to claim 4, wherein each rail has a pair of facing lips defining a longitudinal slot; wherein the conveyor further includes a set of chain-linked baskets drivers; wherein each basket includes a pair of axles, each axle terminating in a push block, each axle adapted to ride between the pair of facing lips, each push block adapted to fit within a basket driver; and wherein each basket driver has a pair of facing basket-retention surfaces such that each basket is held in fixed alignment with direction of travel around the loop.

6. An apparatus according to claim 5, such that each basket is retained, during travel through the enclosure, by a rail outer side, by a rail inner side, and by the pair of facing basket-retention surfaces.

7. An apparatus according to claim 4, wherein a rail outer side has a basket insertion slot.

8. An apparatus for thermolytic distillation of carbonaceous material, comprising:

an enclosure having a top plate, a bottom plate, first and second side plates, an entry-end plate, and an exit-end plate, the entry-end plate and the top plate spaced to define an entry aperture, the exit-end plate and the top plate spaced to define an exit aperture, a reactor bath having a first wall, proximate to the entry-end plate, extending upward from the bottom plate, a second wall, proximate to the exit-end plate, extending upward from the bottom plate, a first baffle extending downward from the top plate and located between the entry-end plate and the first wall, and a second baffle extending downward from the top plate and located between the second wall and the exit-end plate, and at least one vapor exit channel located between the first wall and the second wall, wherein the entry-end plate and the first wall define a degassing bath containing distillate for degassing, wherein the first wall and the second wall define a reactor bath containing molten material for promoting thermolytic reaction to produce char and vapor, wherein the second wall and the exit-end plate define a quenching bath containing water; and wherein the first baffle extends sufficiently down into the degassing bath to provide a seal between a gas-phase volume of the reactor bath and atmosphere at the entry-end plate, and the second baffle extends sufficiently down into the quenching bath to provide a seal between a gas-phase volume of the reactor bath and atmosphere at the exit-end plate;

a conveyor, having baskets for accepting carbonaceous material, conveying the carbonaceous material into the enclosure via the entry aperture, conveying the carbonaceous material through the reactor bath, and conveying char out of the enclosure via the exit aperture; and a condenser, coupled to accept the vapor from the reactor bath, for condensing at least a portion of the vapor to produce distillate.

9. An apparatus according to claim 8, wherein at least one of the first and second side plates includes at least one vapor exit channel between a wall of the reactor bath and a wall of an adjacent bath.

* * * * *